E. W. CORNELL.
MACHINE FOR MAKING WIRE FABRIC.
APPLICATION FILED SEPT. 7, 1906.
930,159.
Patented Aug. 3, 1909.
9 SHEETS—SHEET 1.
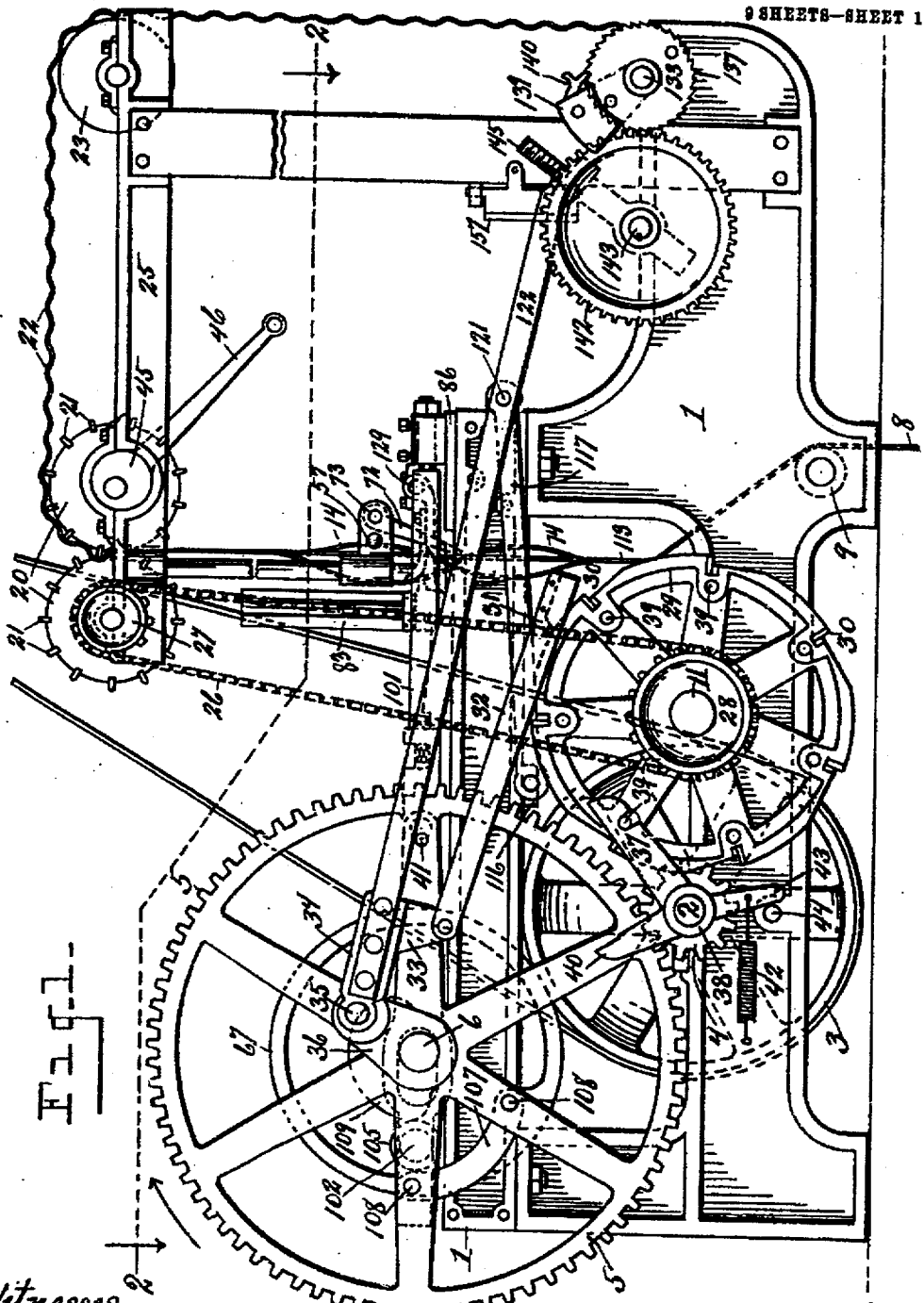

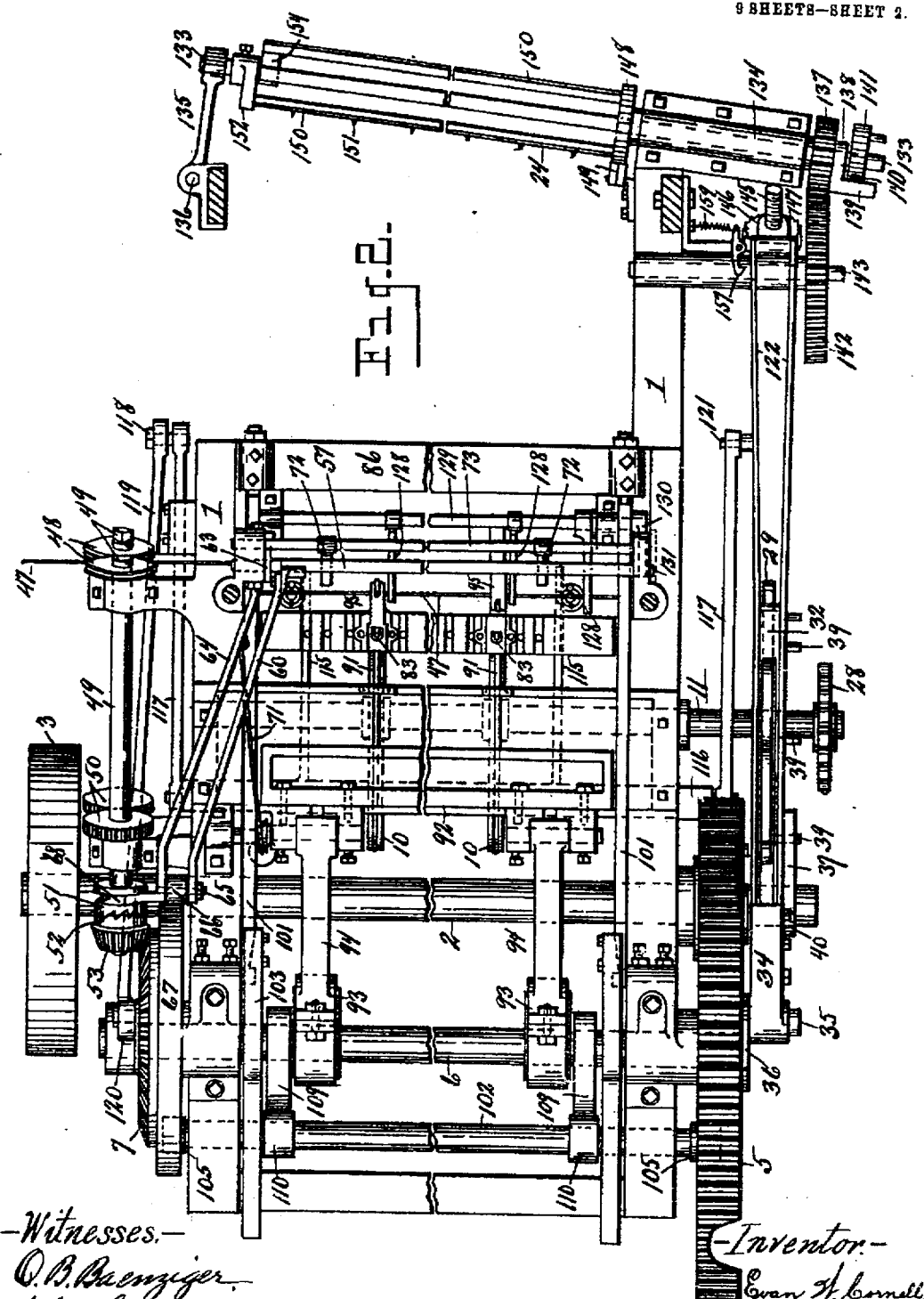

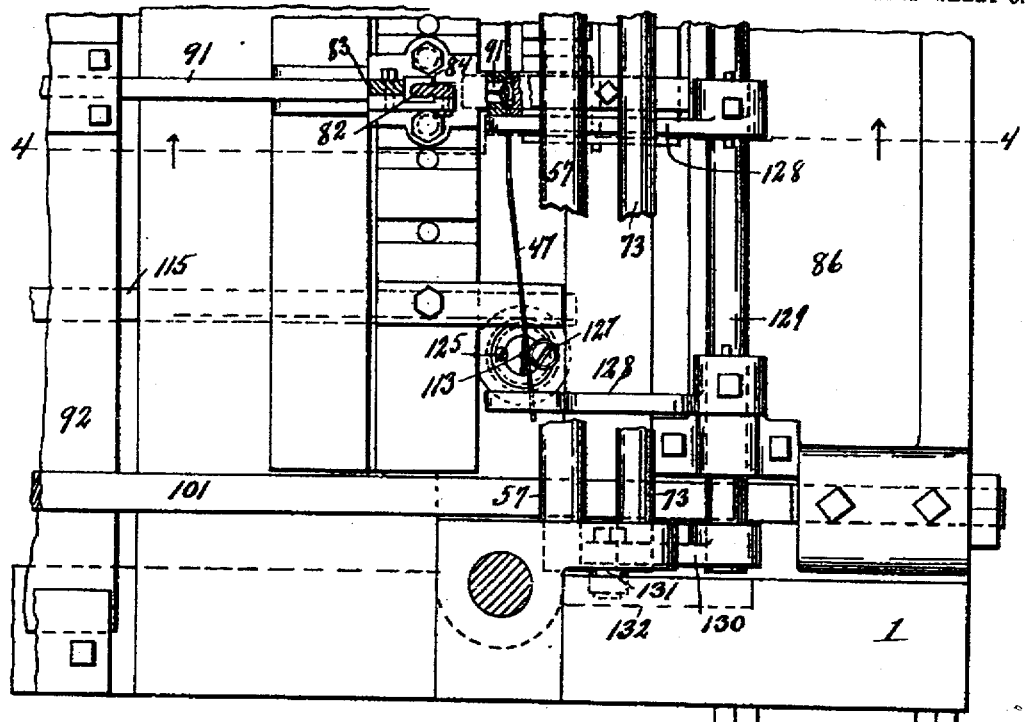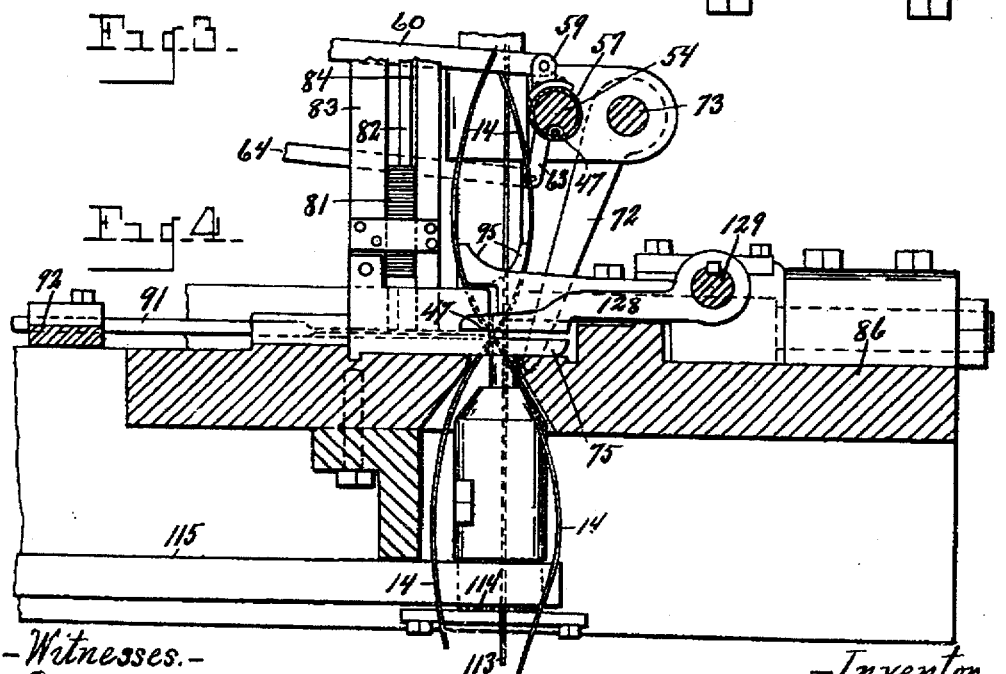

E. W. CORNELL.
MACHINE FOR MAKING WIRE FABRIC.
APPLICATION FILED SEPT. 7, 1906.
930,159.
Patented Aug. 3, 1909.
9 SHEETS—SHEET 4.
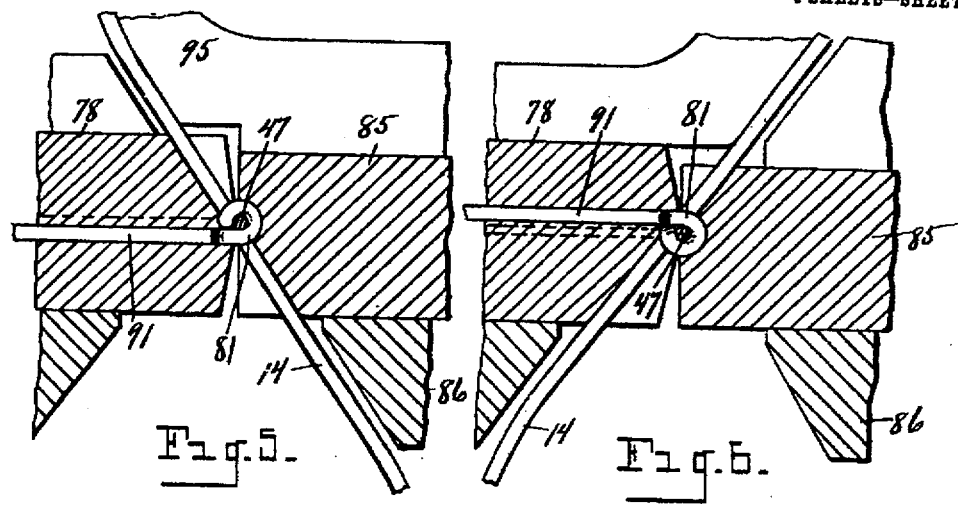
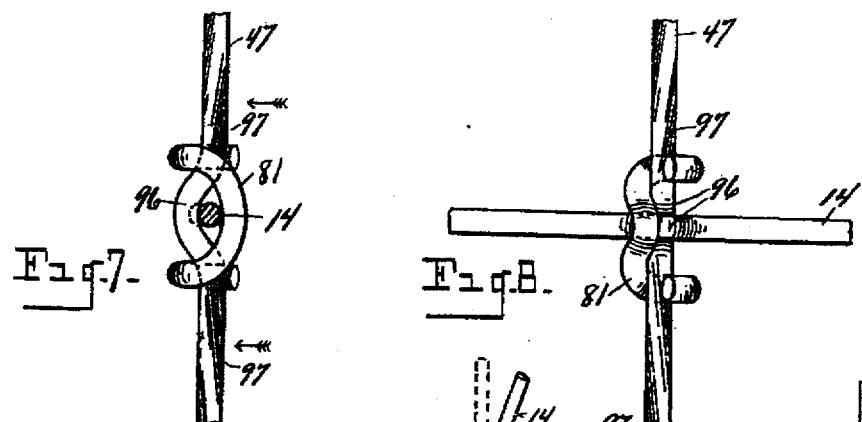
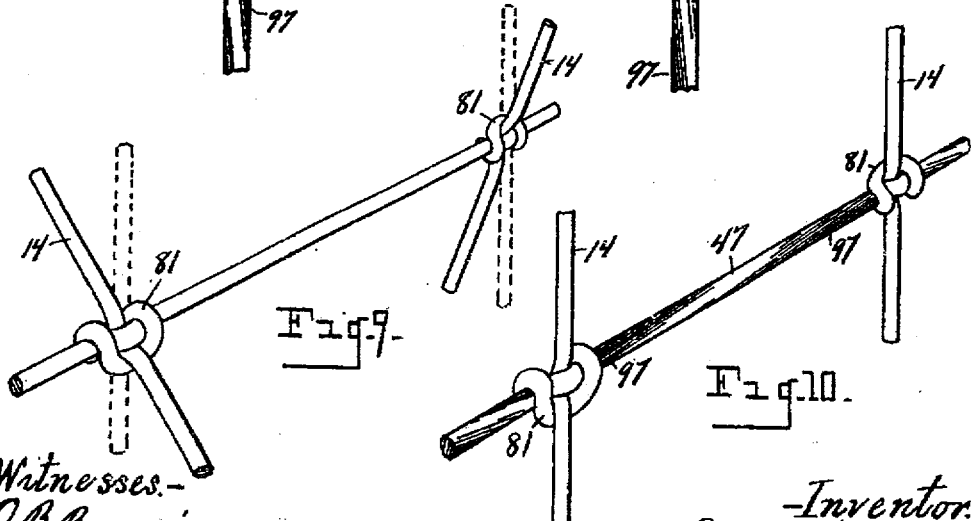

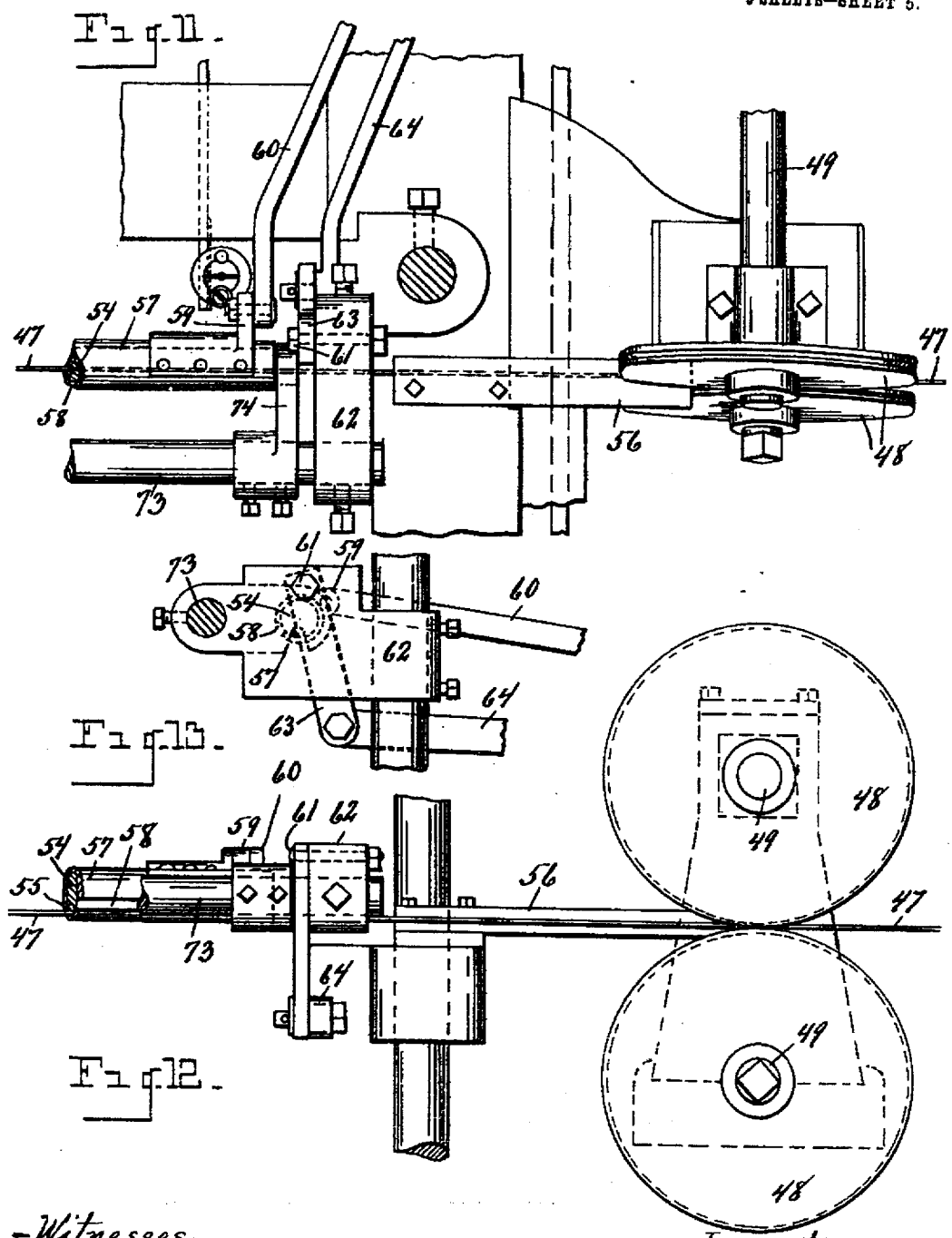

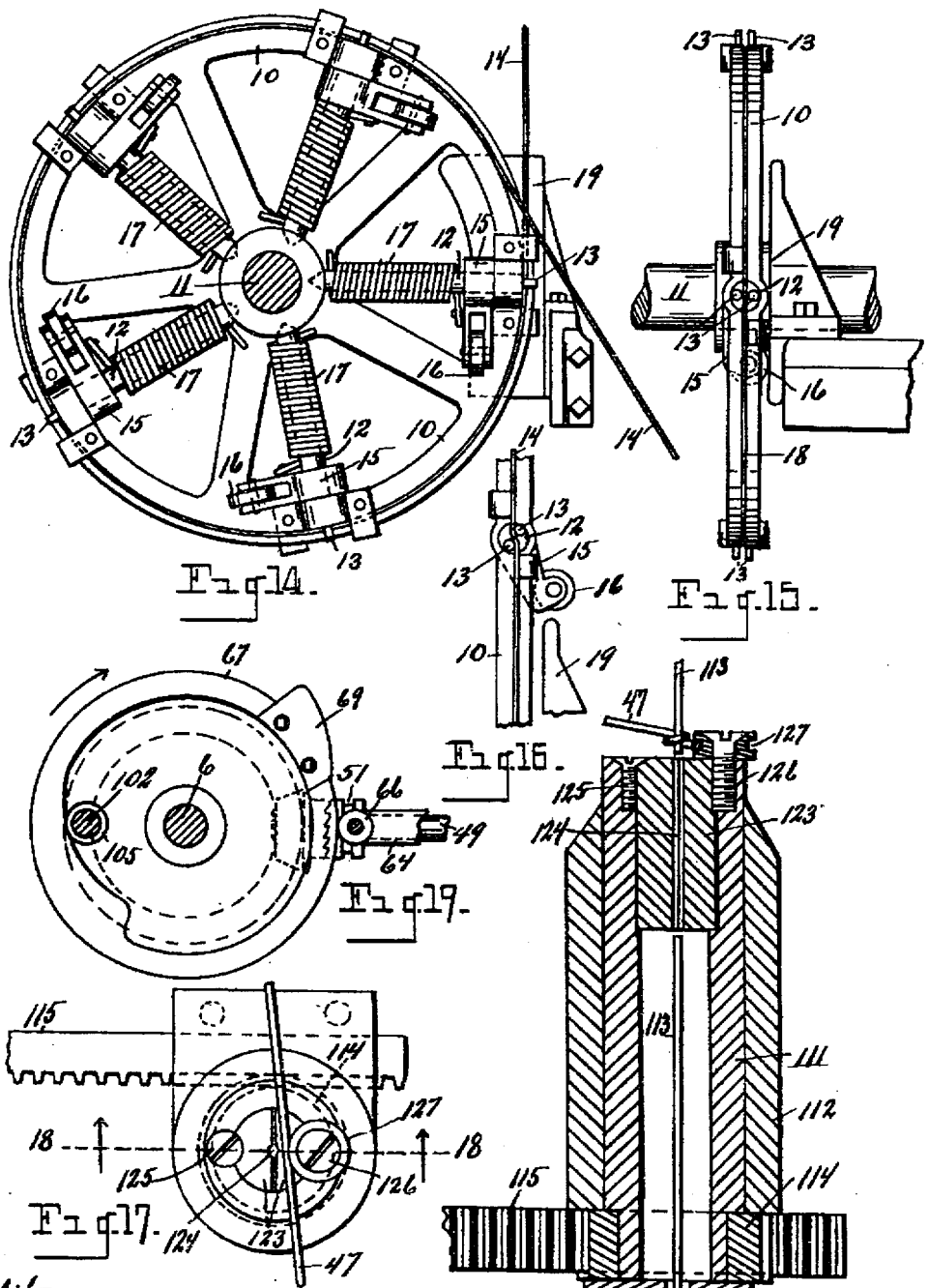

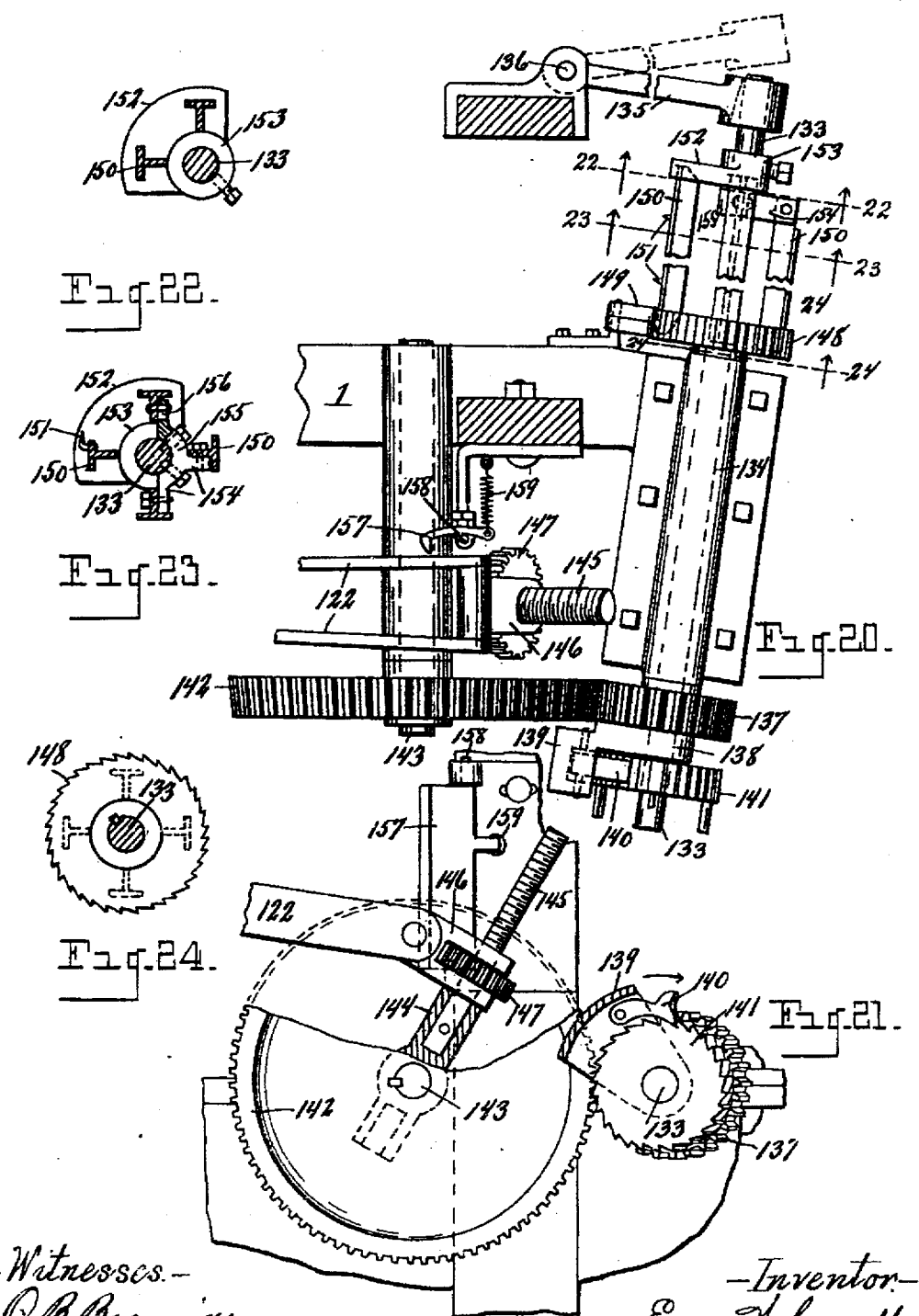

E. W. CORNELL.
MACHINE FOR MAKING WIRE FABRIC.
APPLICATION FILED SEPT. 7, 1906.

930,159.

Patented Aug. 3, 1909.
9 SHEETS—SHEET 8.

Witnesses.—
O. B. Baenziger
I. G. Howlett

Inventor.—
Evan W. Cornell
By E. A. Wheeler & Co. attys

E. W. CORNELL.
MACHINE FOR MAKING WIRE FABRIC.
APPLICATION FILED SEPT. 7, 1906.

930,159.

Patented Aug. 3, 1909.
9 SHEETS—SHEET 9.

Witnesses.
O. B. Baenziger.
J. G. Howlett.

Inventor.
Evan W. Cornell
By F. S. Wheeler & Co. Attys.

UNITED STATES PATENT OFFICE.

EVAN W. CORNELL, OF ADRIAN, MICHIGAN, ASSIGNOR OF ONE-HALF TO AMBROSE B. PACK, OF ADRIAN, MICHIGAN.

MACHINE FOR MAKING WIRE FABRIC.

No. 930,159. Specification of Letters Patent. Patented Aug. 3, 1909.

Application filed September 7, 1906. Serial No. 333,714.

*To all whom it may concern:*

Be it known that I, EVAN W. CORNELL, a citizen of the United States, residing at Adrian, in the county of Lenawee, State of Michigan, have invented certain new and useful Improvements in Machines for Making Wire Fabric; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to machines for making wire fencing, and consists in the construction and arrangement of parts hereinafter fully set forth and pointed out particularly in the claims.

The object of the invention is to provide a machine for the manufacture of wire fencing, wherein the arrangement is such as to enable the production in a simple and economical manner of the fencing illustrated in my copending application, filed February 10, 1906, Serial No. 300,379 wherein a torsion is placed upon the vertical or stay wires to hold taut the staple or tying member by means of which the crossed strands are united. The above object is attained by the structure illustrated in the accompanying drawings, in which:—

Figure 25:
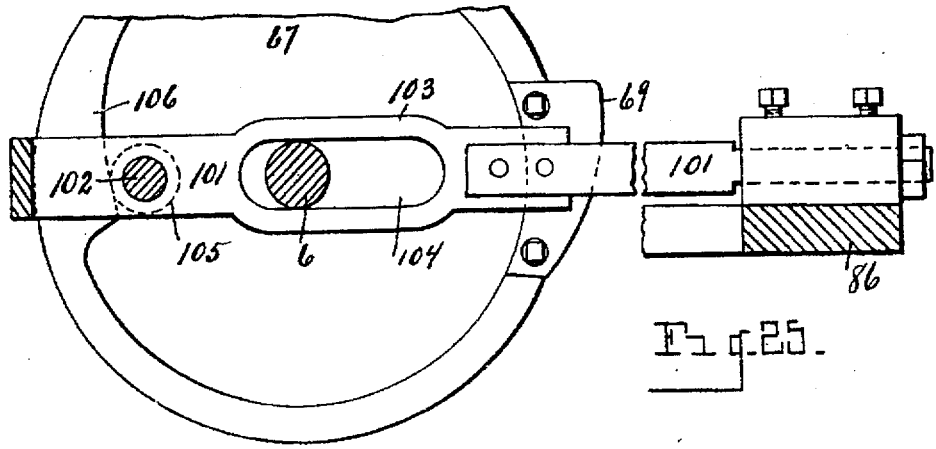
Figure 26:
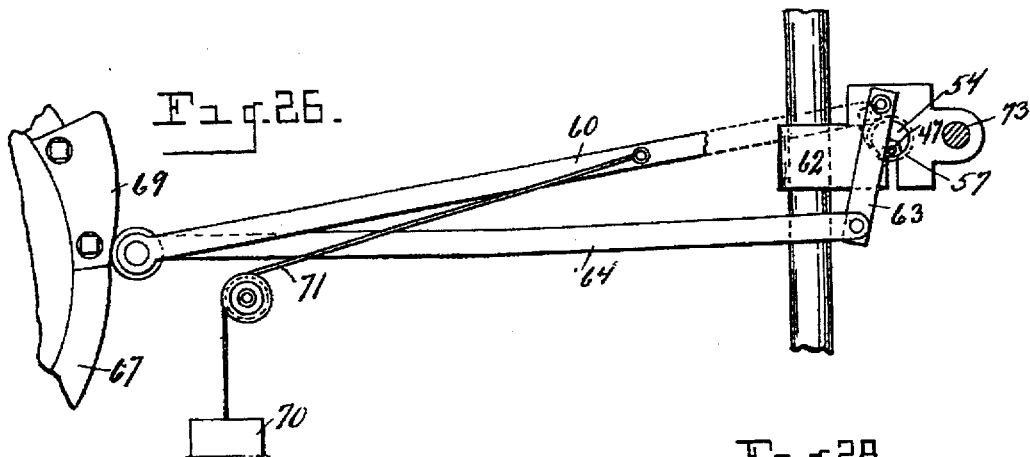
Figure 27:
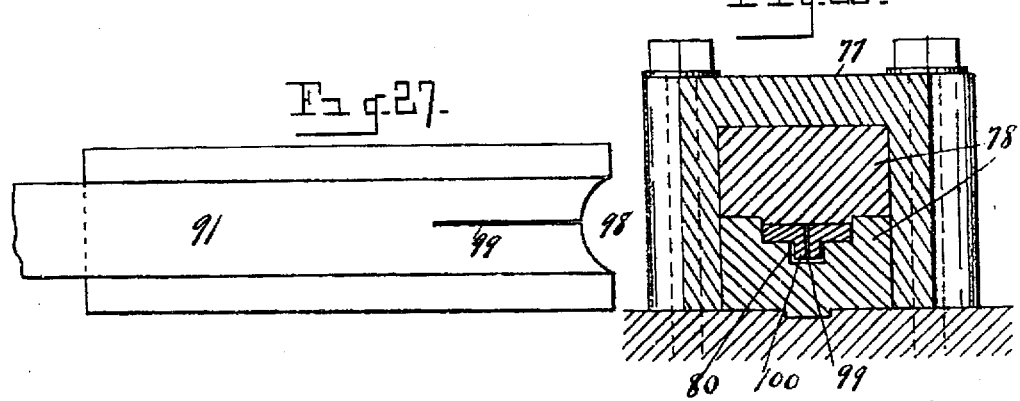
Figure 28:
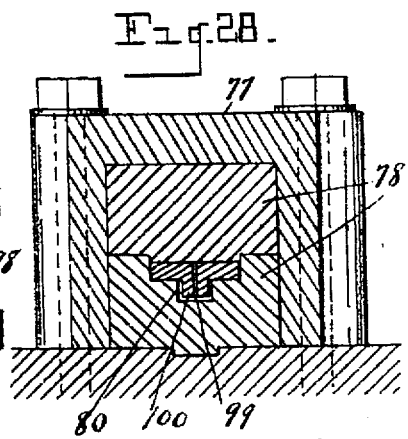
Figures 29, 30:
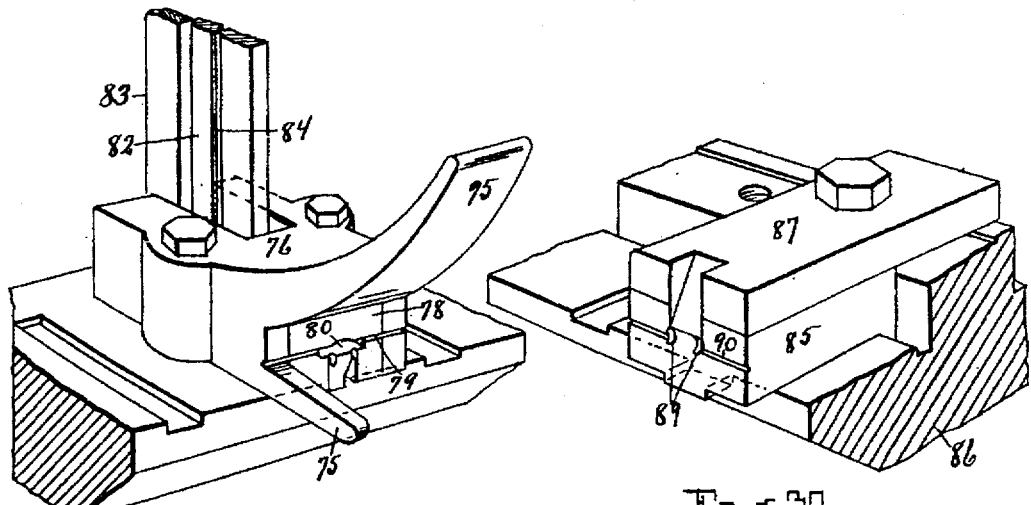
Figures 31, 32:
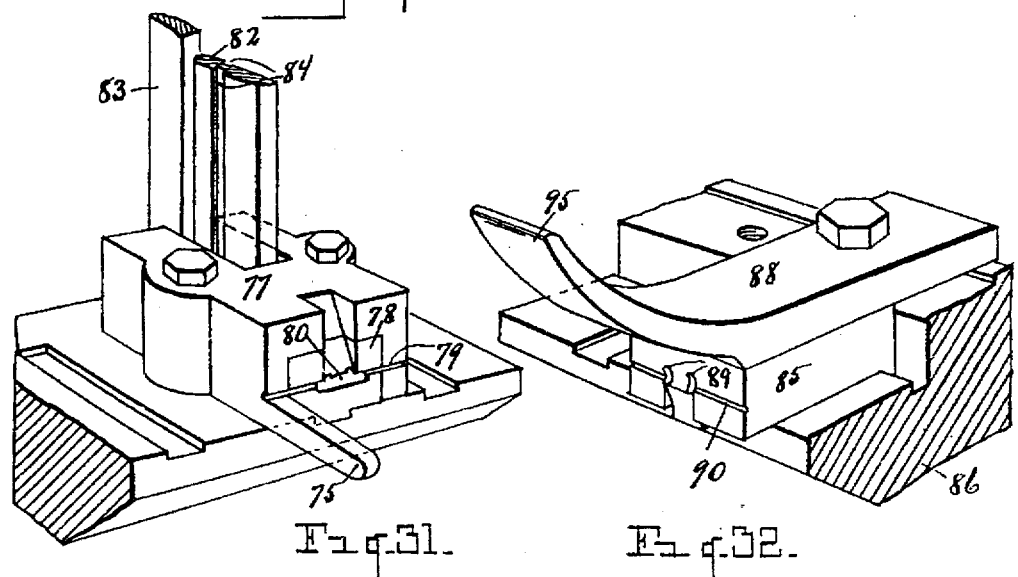

Figure 1 is a side elevation of a machine embodying my invention. Fig. 2 is a plan view of the main portion of the machine, the super-structure being in section as on line 2—2 of Fig. 1. Fig. 3 is an enlarged fragmentary plan view, partly in horizontal section, showing one set of dies with a tie formed therein, and showing one of the twister-heads for wrapping the end of the stay wire around the marginal wire of the fabric. Fig. 4 is a sectional view as on line 4—4 of Fig. 3. Figs. 5 and 6 are sectional views through successive sets of dies in which the ties which unite the crossed strands of the fabric are formed. Figs. 7 and 8 are elevations of two of the ties which are employed to join the crossed strands of the fabric, showing in exaggerated form the twist which is placed upon the stay wires upon each side of the line wires of the fabric. Fig. 9 is a perspective view of a portion of one of the stay wires of the fabric and the relative position of the opposed longitudinal strands to said stay wire when secured by the tying staples thereto, the dotted lines illustrating the position of the longitudinal strands when released by the dies, the return of which to the vertical position, placing a twist or torsion upon the stay wire. Fig. 10 is a perspective view of a section of wire fencing or fabric as manufactured in this machine, showing in an exaggerated manner, the twist applied to the stay wire. Fig. 11 is an enlarged fragmentary view in plan, of the stay-wire feeding-device, and of the cutting and dropping mechanism. Fig. 12 is an elevation of Fig. 11. Fig. 13 is a fragmentary view in elevation of the stay-wire cutting-mechanism. Fig. 14 is a side elevation of one of the wire feeding wheels over which the longitudinal wires pass before entering the machine, the shaft carrying said wheels appearing in transverse section. Fig. 15 is an edge elevation of Fig. 14. Fig. 16 is a fragmentary view in elevation of one of the oscillatory clamping heads carried by the feeding wheels, showing the manner of actuating said head to clamp the wire. Fig. 17 is a plan view of one of the twister-heads employed to wrap the end of the stay wire around the marginal or selvage wire of the fabric. Fig. 18 is a longitudinal section through said head as on line 18—18 of Fig. 17. Fig. 19 is a view of the inner face of the cam wheel on the main shaft, showing some of the parts connected therewith for controlling the feeding of the stay wire and the cutting of the same. Fig. 20 is a fragmentary view in plan of the take-up reel and means for actuating it. Fig. 21 is an end elevation of Fig. 20, a portion of the large gear wheel being broken away. Fig. 22 is a cross section as on line 22—22 of Fig. 20. Fig. 23 is a cross section as on line 23—23 of Fig. 20. Fig. 24 is a cross section as on line 24—24 of Fig. 20. Fig. 25 is a fragmentary view in section of a portion of the machine showing the manner of actuating the cross head carrying the movable dies. Fig. 26 is a fragmentary view showing the stay wire cutting and dropping mechanism. Fig. 27 is a plan view of a portion of one of the dies and the staple driving plunger lying therein. Fig. 28 is a cross section through one of the die holders, showing a two-part die therein and a staple driving plunger in section between the parts of the die. Figs. 29 and 30 are perspective views of a set of mounted dies, said dies being separated to show their working faces and to illustrate the construction of parts. Figs. 31 and 32 are similar views of a succeeding set of dies.

Referring to the characters of reference, 1 designates a suitable frame in which is journaled the main shaft 2 carrying at one end a suitable belt-pulley 3, through the medium of which it may be driven from any desired source of power. Upon the opposite end of the shaft 2 from the pulley 3 is a pinion 4 which meshes with a large gear wheel 5 on one end of a counter-shaft 6 also journaled in the frame and carrying at its opposite end a beveled gear wheel 7, for purposes hereinafter described. The warp or strand wires 8 of the fencing pass upwardly over antifriction rollers 9 and wind onto the measuring wheels 10 mounted upon the transverse shaft 11. There are as many of the measuring wheels as there are warp strands in the fabric, and they are positioned such distance apart on the shaft 11 as to properly space said warp strands in the fabric or fencing.

It is important that the longitudinal strands of the completed fabric shall be of exactly the same length so that there shall be no warping or buckling of the fabric. To accomplish such a result, the feeding or measuring wheels 10 are provided with means for clamping the longitudinal wires so as to prevent said wires slipping upon the circumference of said wheels, said clamping means consisting of rock shafts 12 mounted radially in said wheels and carrying the opposed clamping pins 13 which project through the rim of the wheel and between which the wires 14 lie. Upon said shafts are crank arms 15 which carry in their outer ends antifriction rollers 16. Surrounding each of the shafts 12 is a coiled spring 17, one end of which engages the arm 15 and the other end the hub or web of the wheel. The tension of said spring is normally exerted to cause the pins 13 to stand obliquely to the channels 18 in the rims of said wheels, as shown in Fig. 16. Adjacent to each of the wheels 10 and secured to the frame of the machine is a straight plate 19 located opposite the point where the strand wires feed onto and pay off of the wheels 10, said plates extending into the path of the rollers 16 in the ends of the cranks 15, whereby as the wheels 10 revolve, each of the crank arms 15 is actuated in succession by contact of its roller 16 with said plate to rotate its shaft 12 against the action of said spring, and cause the pins 13 to stand transversely of the grooves 18, permitting the wires 19 to freely enter between said pins, and freely pass therefrom at the point where the wires pass onto and leave said wheels. As the rotation of the wheels 10 carries each of the rollers 16 in succession beyond the ends of the plates 19, the springs 17 actuate the cranks 15 to rotate the shafts 12, thereby clamping the wires 14 between the pins 13, as clearly shown in Fig. 16, and preventing said wires slipping upon the circumference of the wheels, insuring a perfect feeding of the strands into the machine, and maintaining said strands at a uniform length. From the feeding wheels the wires pass upwardly between the dies wherein the transverse strands are attached thereto in a manner hereinafter explained, and thence pass upwardly between the crimping rollers 20 provided with meshing longitudinal bars 21 between which the longitudinal strands of the fabric are crimped, as shown at 22. From the crimping rollers the fabric is carried over a roller 23 and downwardly to a reel 24 upon which the completed fabric is wound in a manner hereinafter explained. The crimping rollers and the roller 23 are journaled in a super-structure 25 carried by suitable vertical supports mounted upon the main portion of the frame of the machine, and the crimping rollers are driven by means of a sprocket chain 26 which passes over a sprocket wheel 27 on the shaft of one of said rollers and over a sprocket wheel 28 on the outer end of shaft 11. By this arrangement, the crimping rollers are actuated concurrently with the operation of the feed wheels in feeding the wire into the machine.

In fence machines of this type, it is necessary that the feeding of the strand wires shall cease during the operation of tying the staples which unite the strand and stay wires. To render the movement of the feeding wheels intermittent, there is employed upon the outer end of the shaft 11 carrying said wheels, a large ratchet wheel 29 having notches 30 in the periphery thereof adapted to be engaged by a pawl 31 (see dotted lines in Fig. 1) mounted between the sides of a connecting bar or pitman 32 which is supported over the wheel 29 and is pivotally attached to a bracket 33 depending from the coupling 34 journaled on the crank pin 35 of the crank 36 on the end of shaft 6. By the movement of said crank the bar 32 is reciprocated, causing the pawl carried thereby to successively engage in the notches of the wheel 29 and rotate said wheel intermittently. To lock the feed wheels against motion except at the desired intervals, an arm 37 is employed attached to a sleeve 38 journaled on the end of shaft 2, said arm having a notch therein which engages in succession the pins 39 projecting from the side of the wheel 29. Extending from the collar 38 at right angles to the arm 37 is a second arm 40 which extends into the path of a pin 41 carried on the side of the large gear wheel 5. The parts are so positioned that the moment the pawl 31 engages one of the notches in the ratchet wheel 29, the pin 41 will encounter the arm 40 and rotate the sleeve 38 to raise the arm 37 from engagement with the pin 39, thereby releasing the ratchet wheel and permitting it to be turned by the pawl 31. After the passage of the pin 41 from contact with the arm 40, the arms 37 and 40 are returned to their normal position by a coiled spring 42 attached to a third arm 43 extending downwardly from sleeve 38. A stop 44 prevents the arm 43 being drawn too far by the spring 42.

The operation just described is such as to cause an intermittent rotation of the feed wheels and the crimping rollers between which the completed fabric passes, the longitudinal strands of the fabric remaining at rest while the transverse strands are being secured thereto, as hereinafter stated. It will be noted that the shaft of one of the rollers 20 is mounted in eccentric bearings 45 adapted to be actuated by the lever 46, whereby the distance between the crimping rollers may be varied at pleasure, by rotating said bearings through the operation of said lever, as will be well understood. The transverse or stay wires 47 of the fabric are fed into the machine intermittently in a continuous strand between the grooved feed wheels 48 which are mounted upon parallel shafts 49 driven in unison by engagement of the gear wheels 50 thereon (see Figs. 2, 11 and 12). One of the shafts 49 is provided with a clutch collar 51 splined thereon adapted to engage a clutch member 52 on the hub of the beveled pinion 53 loose on the end of said shaft, said pinion meshing with the beveled gear 7 carried on the shaft 6. While the clutch 51 is in engagement, the feed wheels 48 will be revolved to carry the cross wire into the machine.

In order to direct the stay wires properly into place and cut them the desired length, there is employed a round stationary bar 54 which extends transversely of the machine in line with the feed rollers 48, and which is provided in its under side with the longitudinal channel 55 into which the end of the stay wire is directed by the horizontal guide 56. Surrounding the channeled bar 54 is a hollow rock shaft 57 with a slot 58 extending the entire length of said shaft. Attached to the end of the rock shaft 57 is an arm 59 to the free end of which is pivoted a reciprocatory rod 60 through the operation of which said shaft is rocked or oscillated about its axis. Pivoted at 61 to a bracket 62 forming a part of the stationary frame is a depending shear 63 which lies contiguous to the end of the bar 54. To the lower end of the shear 63 is pivoted an actuating rod 64. The rods 60 and 64 are connected at their rear ends by a transverse bolt 65 upon which is journaled an antifriction roller 66 which lies against a cam wheel 67 mounted upon one side of the gear wheel 7. At the rear end of the rod 64 projects a yoke 68 which lies in a peripheral channel in the clutch collar 51. The rotation of the cam wheel 67 will cause the cam plate 69 (see Fig. 19) carried thereby, to engage the antifriction roller 66 and move it laterally, causing the yoke 68 to disengage the clutch collar 51 from the pinion 53, thereby stopping the rotation of the shafts 49 and the feed wheels, and at the same time through the operation of the rods 60 and 64 rocking the shaft 57 to carry the slot therein into alinement with the channel 55 in the bar 54, and actuating the shear 63 to sever the stay wire, thereby permitting the severed portion to drop through the slot 58 in the rock shaft and into position in the machine. When the cam plate 69 shall have passed from engagement with the roller 56, said parts will be restored to their normal position and the feed wheels again set in operation through the medium of the weight 70, shown more clearly in Fig. 26, which is attached to one end of a cable 71, the opposite end of said cable being attached to the rod 60, when a succeeding stay wire will be fed into the channel of the bar 54, severed the proper length and by the oscillation of the slotted shaft 57 dropped into the machine, the operation continuing intermittently as fast as said wires are required for use.

After the cross wires are severed and dropped from the slotted rock shaft 57, they are directed into the machine by the inclined guides 72 mounted upon a transverse rod 73 which crosses the machine transversely and at one end is provided with a bracket 74 that supports the ends of the channeled bar 54 upon which the slotted shaft 57 oscillates. The stay wires drop upon the horizontal arms 75 extending from the die clamps 76 and 77 respectively on the stationary side of the machine. Within said die clamps are the forming die members 78 comprising one half of the dies in which are driven the tying staples which unite the crossed strands of the fabric. The die members 78 are provided with the horizontal channels 79 in the face thereof, that receive the transverse or stay wires, each of said die members having a horizontal opening 80 therethrough into which the tying staple is directed and in which the plunger which forms said staple into a tie, is introduced. The tying staples 81 are introduced to the opening 80 in the die members 78 by means of a vertical staple slide 82 which is embraced by the staples and down which the staples are directed by the vertical guide piece 83. Each of the staple slides 82 is provided in its opposite faces with a vertical channel 84 in line with the points of the staples, thereby preventing a bur upon the staple points causing the staples to bind upon the slide and prevent their feeding downwardly thereon.

The opposed die members 85 which with the die members 78 complete the dies in which the staples are driven to tie them around the crossed strands of the fabric, are mounted upon a reciprocatory cross head 86 supported at its ends to slide on the main portion of the frame, said die members 85 being secured in place by the clamping plates 87 and 88. In the face of the die members 85 are the concavities 89 which direct the ends of the staples around the stay wire lying in the channel 90 therein crossing the face of said die members and registering with the channel 79 in the die members 78. When the working faces of the die members 78 and 85 are brought together by the movement of the cross head 86, the stay wire is confined between the faces of the dies in a horizontal position within the registering channels 79 and 90, while the strand wires of the fabric pass upwardly between the faces of the dies in a position to be straddled by the legs of the staples when driven. At the moment the dies are brought together with the strand and stay wires between the faces thereof, the tying staples are driven to unite said wires by a plurality of reciprocatory plungers 91 which enter the channels 80 in the die members 78 and force the staples through said channels into the dies wherein they are formed around the crossed strands of the fabric in a manner shown in Figs. 5 to 10 inclusive, said plungers being attached to a slidable frame 92 actuated through the operation of eccentrics 93 (see Fig. 1) mounted on the shaft 6 and connected with the frame 92 by means of the eccentric rods 94. It will be noted that associated with each alternate set of the die members in opposed relation and arranged staggeringly are the inwardly extending curved members 95 which project beyond the working faces of the die members and which engage the longitudinal or strand wires successively from opposite sides as the die members are brought together and carry said strand wires out of vertical alinement, causing them to cross the stay wire within the dies at an angle, as clearly shown in Fig. 4. On referring to Figs. 7 to 10 inclusive, it will be seen that the stay and strand wires, by the action of the dies when brought together, are crimped at the point of crossing, as shown at 96, and that when joined together by the tying staple 81, they are locked so as to prevent rotation one upon the other. Because of the fact that said crossed wires are so locked when the dies separate after completing the tying of the crossed strands, the straightening of the strand wires will exert a twist in opposite directions upon each section of the stay wire lying between the tying staples, as shown in exaggerated form at 97 in Figs. 7, 8 and 10, thereby placing such stress upon the parts where joined by the ties, as to prevent the ties becoming loose and allowing a displacement of the strands of the fabric.

On referring to Fig. 27, it will be seen that each of the plungers 91 is concaved, as at 98, to fit the loop of the staples 81 and that said plungers are slotted, as at 99, for a portion of their length, in order to allow the working end of the plunger to slightly spread under extreme pressure, and fit the guide channel 80 closely, so as to prevent breaking the plunger at the corners. It will also be noted on referring to Fig. 28 that the plungers are provided with strengthening ribs 100 at the center.

The slidable cross head 86 carrying the movable die members is actuated through the medium of the connecting bars 101 which are attached at one end to said cross head and at the other end to a reciprocatory shaft 102, said bars having an enlarged portion 103 with a slot 104 therein to freely receive the shaft 6. Upon the ends of the shaft 102 are antifriction rollers 105 adapted to be engaged respectively by a cam 106 on the inner face of the cam wheel 67 and by a cam plate 107 secured at 108 to the spokes of the gear wheel 5. It will therefore be apparent that the rotation of the shaft 6 carrying the wheels 5 and 67 will cause the cams 106 and 107 to engage the rollers 105 on the shaft 102 and slide said shaft horizontally, thereby moving the cross head 86 to separate the die members. The cross head is moved in the opposite direction to bring the die members together by means of the cams 109 on the shaft 6 engaging the antifriction rollers 110 on the slidable shaft 102 to move said shaft in the opposite direction, whereby the connecting bars 101 are drawn upon at the proper time to slide the cross head 86 so as to bring the dies together upon the crossed strands of the fabric.

The top and bottom wires of the fencing, or what might be termed the selvage wires of the fabric, are not secured to the stay wires by means of a staple, as are the intermediate strand wires, but instead the ends of the stay wires are wrapped around said selvage wires to dispose of the projecting ends of the stay wires and attach them to the selvage wires, by the movement of rotary twister heads 111 more clearly shown in Figs. 17 and 18 which are confined to rotate in an embracing case 112 and through which pass the selvage wires 113. Upon each of the rotary twister heads at its base is a pinion 114 which meshes with a rack 115 adapted to be reciprocated by means of a cross bar 116 to which said racks are attached, said cross bar being actuated by means of the connecting rods 117 attached to the ends thereof. One of said connecting rods is pivoted at 118 to a pitman 119 coupled to a crank arm 120 on the shaft 6; the other of said connecting rods being pivoted at 121 to a pitman 122 on the opposite side of the machine connected to the coupling 34 journaled on the pin of the crank 36. By this arrangement, the cross bar 116 is reciprocated to move the racks 115 and rotate the twister heads 111. The selvage wires are threaded through the twister heads and within the upper ends of said heads is a two-part steel bushing 123 having an eye 124 through which the wire passes and in which it is held as the head rotates to wind the end of the cross wire 47 thereon. This steel bushing is made in two parts to enable it to be removed from the wire passing through the twister head when a splice in said wire is encountered of such size as to prevent the wire passing through the bushing. Because of the fact that said bushing is divided, both parts must be held within the twister head. One part of said bushing is held by the screw 125 and the other part by the screw 126. The last-named screw carries upon its upper end a grooved roller 127 which rotates thereon and which receives in the groove therein the end of the stay wire. With the parts in the position shown in Figs. 17 and 18, the rotation of the twister head to the right will lap the end of the stay wire around the strand wire, as shown in Fig. 18.

In order to hold the ends of the stay wires 47 in place while being wound around the selvage wires of the fabric, and in order to press said wires down upon the supporting arms 75 to insure a proper entrance of the stay wire in said dies, when said dies are brought together, there are employed a number of swinging arms 128 which are mounted upon a rock shaft 129 journaled on the reciprocatory cross head 86. On one end of said rock shaft is a crank arm 130 carrying at its free end an antifriction roller 131 (see Fig. 3) adapted to travel in an inclined way, shown by dotted line 132, in the stationary portion of the frame, whereby as the cross head 86 reciprocates, said crank arm will be actuated to rock the shaft 129 to swing the arms 128 downwardly onto the stay wire to hold said wire in position during the operation of attaching it to the strand wires of the fabric, the arrangement being such that the arms 128 swing downwardly as the dies come together and swing upwardly as the cross head recedes to open the dies, thereby carrying them out of the way of the upwardly moving fabric.

As before stated, the completed fabric is wound upon a reel 24 at the tail of the machine, said reel being mounted on and rotatable with a shaft 133 journaled at one end in a long bearing 134, and at the other end journaled in a swinging arm 135 pivoted at 136 to a suitable support. On one end of said shaft is a loose pinion 137 carrying an arm 138 made rigid thereto, provided with an overhanging member 139 in which is pivoted a gravity pawl 140 that engages the teeth of a ratchet wheel 141 fast on the shaft 133. Meshing with the pinion 137 is a gear wheel 142 fast on the end of the short shaft 143 journaled in the frame and having fast thereon a crank arm 144 carrying a fixed screw 145. Mounted loosely upon said screw is a yoke 146 between the sides of which is a ratchet wheel 147 having a tapped central opening through which passes the screw 145. Pivoted to the yoke is the pitman 122 whereby as the pitman reciprocates the crank arm 144 is oscillated and the shaft 143 is rocked to swing the gear wheel 142. The swinging of said gear wheels imparts a similar motion to the pinion 137; the turning of said pinion to the right will carry with it the crank arm 138 and cause the pawl 140 to turn the ratchet wheel 141, thereby imparting a rotary movement to the shaft 133. A rotary movement of said pinion in the opposite direction will cause the pawl to ride over the teeth of the ratchet wheel without imparting movement to the shaft 133. By this arrangement, an intermittent rotary movement is imparted to the reel, the arrangement being such that the reel is rotated after each operation of tying the stay wire to the strand wires of the fabric, the rotation of said wheel drawing upon the strand wires to pull the fabric through the machine a distance equal to the space between the stay wires. To prevent the reel turning backwardly when the pawl is retracted after each rotary movement there is fixed to the shaft 133 a wheel 148 having teeth upon its periphery engaged by a detent 149 which prevents a backward turning of the shaft of the reel. The reel proper consists of longitudinally extending T-bars 150 which are supported at one end in suitable sockets in the side of the wheel 148, at the other end of the reel the bar having the hooks 151 and one of the adjacent bars thereto, are supported in sockets in the web 152 of a removable collar 153 mounted on shaft 133, the other bars at that end of the reel are riveted to the radial arms 154 of the fixed collar 155 on said shaft. When the reel shall have been filled with the fencing or fabric and it is desired to remove the bundle, the arm 135 which supports the end of the reel is swung outwardly, as shown by dotted lines in Fig. 20 and the collar 153 removed. The removal of said collar releases the bar having the hooks 151 so as to permit it to be withdrawn with the bundle and allows the end of the adjacent bar to drop downwardly, as provided for by the slot 156 (see Fig. 23) thereby allowing the reel to collapse to permit the bundle to be withdrawn therefrom. After the removal of the bundle, the parts are restored for a succeeding operation.

It is well understood in the art that as the bundle of wire fencing increases in size upon the reel, the distance which said reel is rotated at each operation must be proportionately decreased. To accomplish such a result, a long vertically disposed dog 157 is pivoted at 158 so as to stand in the path of the ratchet wheel 147 upon the screw of the crank arm 144. As the movement of said arm carries the ratchet wheel past said dog, it engages in the teeth thereof and rotates said wheel so as to cause it to run outwardly upon the threads of the screw 145, whereby as the size of the bundle upon the reel increases, the stroke of the crank arm 144 is caused to decrease by gradually moving the point of attachment of the pitman 122 away from the axis of said crank. A wire spring 159 is attached to the dog 157 to hold it in engagement with the ratchet wheel when moving in one direction, yet permitting said wheel to pass said dog upon the return movement.

Having thus fully set forth my invention, what I claim as new and desire to secure by Letters Patent, is:—

1. In a machine for making wire fabric, the combination with the means for carrying the strand wires through the machine, of the means for introducing the stay wires into the machine across the strand wires, means for deflecting the strand wires from the plane of the fabric between the points of crossing of the strand and stay wires, and means for uniting the stay and strand wires at their points of crossing while the strand wires are so deflected.

2. In a machine for making wire fabric, the combination with the means for carrying the strand wires through the machine, of the means for introducing the stay wires into the machine at right angles to the strand wires, means for holding the crossed wires of the fabric while being joined, means for deflecting the strand wires from the plane of the fabric successively in opposite directions, and means for tying the crossed strands of the fabric together while the strand wires are so deflected.

3. In a machine for making wire fabric, the combination with the means for carrying the strand wires through the machine, of the means for introducing the stay wires across the strand wires, means for holding the crossed strands of the fabric while being joined, means for crimping said crossed strands together at the junction thereof, means for deflecting the strand wires from the plane of the fabric in succession in opposite directions, and means for tying the crossed strands together while the strand wires are so deflected.

4. In a machine for making wire fabric, the combination with means for carrying the strand wires through the machine, of means for introducing the stay wires across the strand wires, means for placing a torsion upon the stay wires, and means for tying the strand and stay wires together to maintain said torsion in the latter.

5. In a machine for making wire fabric, the combination with the means for carrying the strand wires through the machine, of the means for introducing the cross wires, means for placing a torsion in one of them, and means for so tying said wires together as to preserve said torsion.

6. In a machine for making wire fabric, the combination with the means for carrying the strand wires through the machine, of the means for introducing the cross wires, die members for embracing said strand and cross wires, projections upon said die members for engaging the strand wires between the points where the strand wires cross the stay wires to carry the strand wires out of the plane of the fabric between the stay wires, and means for tying the crossed strands of the fabric together within the dies.

7. In a machine for making wire fabric, the combination with the means for carrying the strand wires through the machine, of the means for introducing the cross wires, die members for clamping the crossed wires preparatory to joining them, projections upon said die members engaging the strand wires and deflecting them successively in opposite directions from the plane of the fabric, and means for tying the crossed wires together while the strand wires are so deflected.

8. In a machine for making wire fabric, the combination with the means for introducing the strand and stay wires into the machine at right angles to each other, dies for clamping said wires together preparatory to being joined, reciprocatory plungers in said dies for driving the staples which join the crossed wires, staple slides rising from said dies down which the staples are directed to the plungers, said staple slides having vertical channels in the opposite sides thereof which afford clearance for the points of the staples.

9. In a machine for making wire fabric, the combination with the means for introducing the strand wires into the machine, of the cross wire feeding and cutting mechanism consisting of the rotary feed wheels driven by a clutch, a channeled bar adapted to receive the cross wire, a hollow rock shaft encircling said bar, and having a longitudinal slot through which the cross wire is adapted to pass, a shear for severing the cross wire, reciprocatory rods for actuating the rock shaft and the shear, a clutch mechanism controlling the feed wheels connected with said rods and a cam for actuating said rods and clutch mechanism.

10. In a machine for making wire fabric, the combination with the means for introducing the cross wires into the machine, of the means for introducing the strand wires into the machine and carrying said wires therethrough, feed wheels around which both said wires pass, each of said feed wheels having radial rock shafts carrying opposed pins which project through the periphery of said wheel and between which the strand wire is adapted to lie, a crank arm on each of the rock shafts, a member in the path of said arms to actuate each crank arm and turn each shaft, and a spring upon each shaft to impart a partial rotation in the opposite direction when the crank arm is released.

11. In a machine for making wire fabric, the combination with the means for carrying the strand wires through the machine, of the means for introducing the cross wires, means for tying the strand and cross wires together, rotary twister heads through which the marginal strands pass, means upon said heads for engaging and twisting the ends of the cross wires around said marginal wires, and a two-part removable bushing in said twister heads through which the marginal wires pass.

12. In a machine for making wire fabric, the combination with the means for joining the strands of the fabric in the machine, of a reel on which the fabric is wound, a relatively long bearing supporting the shaft of said reel at one end, a removable bearing supporting the opposite end of the reel shaft, means for collapsing said reel, and means for rotating said reel at a variable speed.

13. In a machine for making wire fabric, wherein the ends of the cross wires are wrapped around a marginal wire, the combination of a twister head, a divided removable cylindrical bushing within said head through which the marginal wire passes, and means on said twister head for engaging and turning the end of the cross wire around said marginal wire.

In testimony whereof, I sign this specification in the presence of two witnesses.

EVAN W. CORNELL.

Witnesses:
FRANK L. HOUGH,
EMMA R. TRAVERS.